(12) United States Patent
Riley et al.

(10) Patent No.: US 10,289,088 B2
(45) Date of Patent: May 14, 2019

(54) SYSTEMS AND METHODS TO CONTROL A POWER SPLIT BETWEEN ENERGY GENERATION AND ENERGY STORAGE ASSETS

(71) Applicant: General Electric Company, Schenectady, NY (US)

(72) Inventors: Patrick Shane Riley, Rexford, NY (US); Irene Michelle Berry, Schenectady, NY (US); Rogier Sebastiaan Blom, Ballston Lake, NY (US); Glen David Merfeld, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/182,400

(22) Filed: Nov. 6, 2018

(65) Prior Publication Data

US 2019/0072921 A1   Mar. 7, 2019

Related U.S. Application Data

(63) Continuation of application No. 14/857,973, filed on Sep. 18, 2015, now Pat. No. 10,120,357.

(51) Int. Cl.
*G05B 19/042* (2006.01)
*G06Q 50/06* (2012.01)

(52) U.S. Cl.
CPC ......... *G05B 19/042* (2013.01); *G06Q 50/06* (2013.01); *G05B 2219/2639* (2013.01); *Y02B 70/3241* (2013.01); *Y04S 20/227* (2013.01)

(58) Field of Classification Search
CPC ......... G05B 19/042; G05B 2219/2639; G06Q 50/06; Y02B 70/3241; Y04S 20/227
See application file for complete search history.

(56) References Cited

U.S. PATENT DOCUMENTS

| | | | | |
|---|---|---|---|---|
| 8,744,641 B2* | 6/2014 | Ito | ............................ | H02J 3/32 250/203.4 |
| 8,788,110 B2* | 7/2014 | Taima | ...................... | B60L 3/12 700/286 |
| 9,008,849 B2* | 4/2015 | Ozaki | ....................... | H02J 7/35 700/291 |
| 10,120,357 B2* | 11/2018 | Riley | ..................... | G06Q 50/06 |

(Continued)

*Primary Examiner* — Charles R Kasenge
(74) *Attorney, Agent, or Firm* — GE Global Patent Operation; John Darling

(57) ABSTRACT

An energy generation and storage system includes one or more energy generation assets, one or more energy storage assets, and a system controller. The system controller identifies a plurality of candidate responses to a grid service request. Each candidate response includes a split value that describes a power split between the energy generation assets and the energy storage assets. The system controller determines a plurality of response scores respectively for the plurality of candidate responses based at least in part on a plurality of asset life impact values that describe an impact that the plurality of candidate responses would have on an asset life of at least one of the one or more power generation assets and the one or more energy storage assets. The system controller selects one of the plurality of candidate responses based at least in part on the plurality of response scores.

18 Claims, 4 Drawing Sheets

(56) References Cited

U.S. PATENT DOCUMENTS

| | | | | |
|---|---|---|---|---|
| 2012/0173034 A1* | 7/2012 | Taima | .................... | B60L 3/12 |
| | | | | 700/295 |
| 2012/0323387 A1* | 12/2012 | Ozaki | .................... | H02J 7/35 |
| | | | | 700/291 |
| 2014/0077599 A1* | 3/2014 | Siegel | .................... | H02J 3/30 |
| | | | | 307/43 |
| 2014/0077610 A1* | 3/2014 | Zhang | .................... | H02J 4/00 |
| | | | | 307/80 |
| 2014/0136448 A1* | 5/2014 | Takayama | .......... | G06Q 30/0206 |
| | | | | 705/412 |
| 2015/0032661 A1* | 1/2015 | Manfield | ................ | B60L 1/14 |
| | | | | 705/347 |
| 2016/0364646 A1* | 12/2016 | Fischer | ................ | H02J 3/383 |

* cited by examiner

US 10,289,088 B2

SYSTEMS AND METHODS TO CONTROL A POWER SPLIT BETWEEN ENERGY GENERATION AND ENERGY STORAGE ASSETS

FIELD OF THE TECHNOLOGY

The present subject matter relates generally to energy generation and storage systems and more particularly, to systems and methods to determine a power split between one or more energy generation assets and one or more energy storage assets.

BACKGROUND

Power generation facilities can be configured to deliver various grid services for revenue generation. For instance, power generations systems, such as renewable energy plants, can be configured to respond to requests for grid services, such as peak shaving, frequency response, ramp rate control, purchasing and selling of energy, load following, energy arbitrage, and other grid services. Typically, power generation facilities provide grid services in modal fashion such that the power generation facility responds to power demands for a single grid service at a time. Energy storage systems have become increasingly used to deliver power to utility grids either as part of standalone energy storage systems or as part of a renewable energy farm (e.g., a wind farm or solar farm) with an integrated energy storage system. Energy storage systems can include one or more battery banks or other energy storage devices that can be coupled to the grid via a suitable power converter. Energy storage systems are unique in that energy storage systems have the ability to both deliver and reserve energy for particular grid services.

SUMMARY

Aspects and advantages of embodiments of the present disclosure will be set forth in part in the following description, or may be learned from the description, or may be learned through practice of the embodiments.

One example aspect of the present disclosure is directed to a method for controlling an energy generation and storage system. The method includes accessing, by one or more control devices, data indicative of a grid service request; using, by the one or more control devices, dynamic modeling for predicting a future operational status of one or more energy generation assets or one or more power generation assets of the energy generation and storage system; determining, based on the dynamic modeling, by the one or more control devices, a plurality of response scores respectively for a plurality of candidate responses to the grid service request, each candidate response including one or more operational parameters of the energy generation and storage system, the one or more operational parameters including at least a split value that describes a power split between the one or more energy generation assets and the one or more energy storage assets, and wherein the response score determined for each candidate response is based at least in part on an asset life impact value that describes an impact that such candidate response would have on an asset life of at least one of the one or more power generation assets and the one or more energy storage assets; selecting, by the one or more control devices, one of the candidate responses as a desired response to the grid service request based at least in part on the plurality of response scores; and controlling, by the one or more control devices, the energy generation and storage system according to at least the split value of the desired response, wherein determining, by the one or more control devices, the plurality of response scores respectively for a plurality of candidate responses comprises, for each of a plurality of scoring iterations until a desired response score is achieved: adjusting, by the one or more control devices, at least one of the one or more operational parameters of an input candidate response; and inputting, by the one or more control devices, the adjusted operational parameters of the input candidate response into a scoring model to obtain one of the plurality of response scores; wherein the iterative adjustments to the one or more operational parameters of the input candidate response respectively define the plurality of candidate responses.

Another example aspect of the present disclosure is directed to an energy generation and storage system that includes one or more energy generation assets, one or more energy storage assets, and a system controller communicatively coupled to the one or more energy generation assets and to the one or more energy storage assets. The system controller includes at least one processor and a non-transitory computer-readable medium storing instructions that, when executed by the at least one processor, cause the system controller to receive data indicative of a grid service request; use dynamic modeling for predicting a future operational status of one or more energy generation assets or one or more power generation assets of an energy generation and storage system; identify, based on the dynamic modeling, a plurality of candidate responses to the grid service request, wherein each candidate response includes one or more operational parameters, and wherein the one or more operational parameters include at least a split value that describes a power split between the one or more energy generation assets and the one or more energy storage assets; obtain state of asset data for at least one of the energy generation assets and energy storage assets, wherein the state of asset data for the at least one asset describes at least one of a state of health, a state of charge, a state of emissions, and an efficiency for such asset; determine, for each of the plurality of candidate responses, an asset life impact value that describes an impact to an asset life of one or more of the energy generation assets and the energy storage assets due to such candidate response, wherein the asset life impact value determined for at least one of the energy generation assets or the energy storage assets is based at least in part on the state of asset data obtained for such energy generation asset or energy storage asset; determine, for each of the plurality of candidate responses, a potential revenue value provided by such candidate response; determining, for each of the plurality of candidate response, a total cost value incurred by the system due to such candidate response, wherein the total cost value for each candidate response is based at least in part on the asset life impact value determined for such candidate response; determine, for each of the plurality of candidate responses, a response score based at least in part on a difference between the potential revenue value and the total cost value; select the candidate responses with the largest response score as a desired response; and control the one or more energy generation assets and the one or more energy storage assets in accordance with the desired response.

Another example aspect of the present disclosure is directed to a system controller for controlling one or more energy generation assets and one or more energy storage assets. The system controller includes at least one processor and a non-transitory computer-readable medium storing instructions that, when executed by the at least one processor, cause the system controller to receive data indicative of a grid service request; use dynamic modeling for predicting a future operational status of one or more energy generation assets or one or more power generation assets of an energy generation and storage system; identify, based on the dynamic modeling, a plurality of candidate responses to the grid service request, wherein each candidate response includes one or more operational parameters, and wherein the one or more operational parameters include at least a split value that describes a power split between the one or more energy generation assets and the one or more energy storage assets; obtain state of asset data for at least one of the energy generation assets and energy storage assets, wherein the state of asset data for the at least one asset describes at least one of a state of health, a state of charge, a state of emissions, and an efficiency for such asset; determine, for each of the plurality of candidate responses, an asset life impact value that describes an impact to an asset life of one or more of the energy generation assets and the energy storage assets due to such candidate response, wherein the asset life impact value determined for at least one of the energy generation assets or the energy storage assets is based at least in part on the state of asset data obtained for such energy generation asset or energy storage asset; determine, for each of the plurality of candidate responses, a potential revenue value provided by such candidate response; determining, for each of the plurality of candidate response, a total cost value incurred by the system due to such candidate response, wherein the total cost value for each candidate response is based at least in part on the asset life impact value determined for such candidate response; determine, for each of the plurality of candidate responses, a response score based at least in part on a difference between the potential revenue value and the total cost value; select the candidate responses with the largest response score as a desired response; and control the one or more energy generation assets and the one or more energy storage assets in accordance with the desired response.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments are set forth in the detailed description, which makes reference to the appended figures, in which.

DETAILED DESCRIPTION

Figure 1:
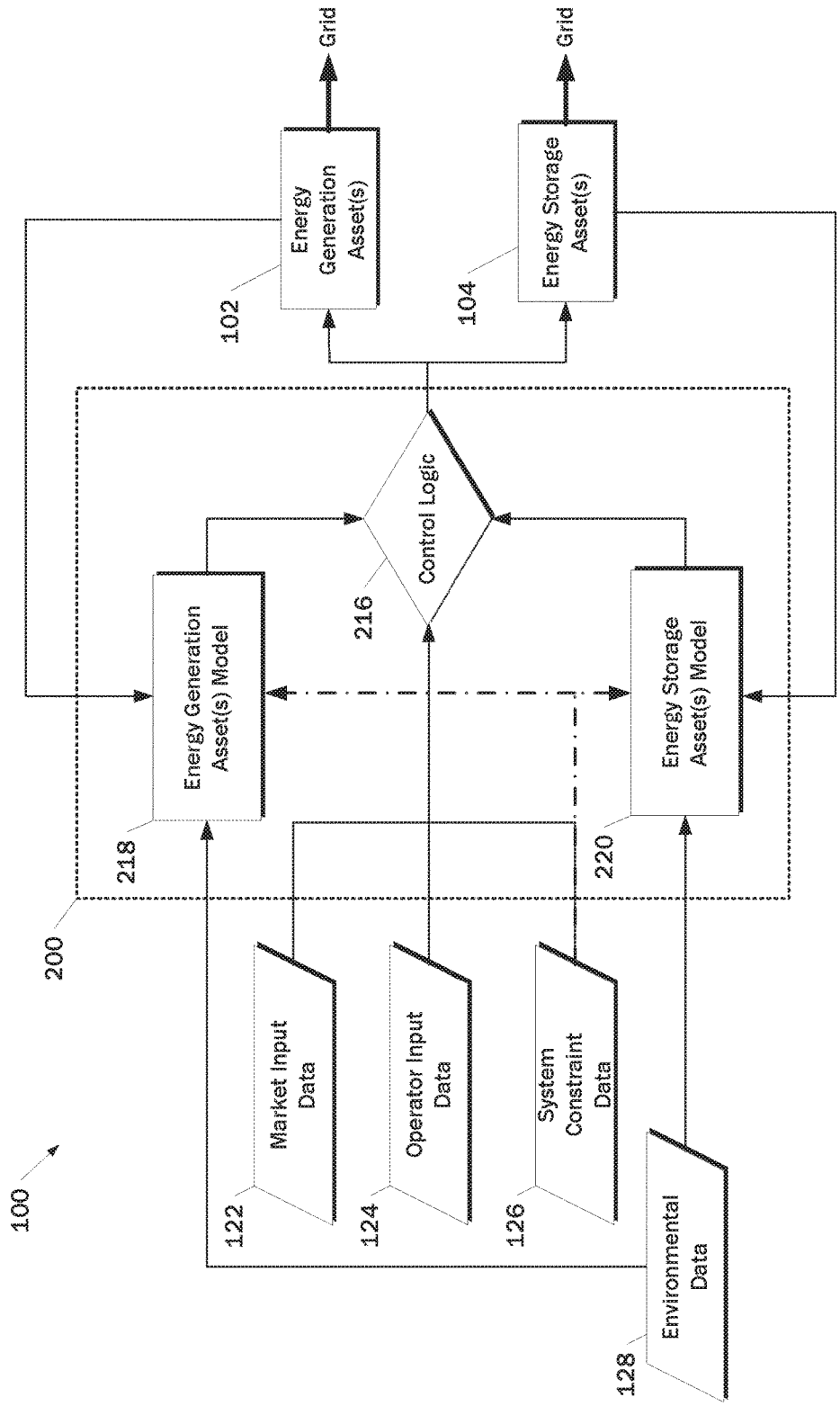
FIG. 1 depicts a schematic diagram of an example energy generation and storage system according to example embodiments of the present disclosure.

Reference now will be made in detail to one or more examples of which are illustrated in the drawings. Each example is provided by way of explanation, not limitation. Various modifications and variations can be made. For instance, features illustrated or described as part of one embodiment can be used with another embodiment to yield a still further embodiment. Thus, it is intended that the disclosure covers such modifications and variations as come within the scope of the appended claims and their equivalents.

Example aspects of the present disclosure are directed to systems and methods that determine a response of an energy generation and storage system to a grid service request in real-time. In particular, a system controller can determine a desired operational response of the system to the grid service request based on various inputs such as, for example, market input data, operator input data, system constraint data, state of asset data, and/or environmental data. More particularly, in view of such various inputs, the system controller can determine a desired operational response that most desirably balances a "trade off" between various benefits and drawbacks that result from potential responses of the system to the grid service request. Example benefits and drawbacks include revenue, decreased asset life, system emissions, system efficiency, and many more considerations.

In particular, in some implementations, the system controller can implement static or dynamic modeling to determine a potential or expected outcome of a particular candidate response in view of the current operational status of the system and other inputs. Each candidate response can be scored on the basis of how satisfactorily its respective expected outcome achieves the desired trade off between response benefits and drawbacks. In some implementations, the particular trade off or desired balance sought to be achieved by the system controller can be controlled or adjusted by user input that describes a desired weight of various objectives. Thus, the desired trade off can change over time.

As one example, the system controller can determine at least a potential revenue value and a total cost value for each of a plurality of candidate responses. Each candidate response can include various operational parameters such as, for example, a total power setpoint of the energy generation and storage system and a split value that describes a power split between the energy generation assets and the energy storage assets of the system. The system controller can select the candidate response that most desirably balances the potential revenue value and the total cost value (e.g., the candidate response that has a largest difference between the potential revenue value and the total cost value). In particular, according to an aspect of the present disclosure, the total cost value for each candidate response can be based at least in part on an asset life impact value that describes an impact that such candidate response will have on an asset life of one or more of the assets.

In this way, the systems and methods according to example aspects of the present disclosure can have a technical effect of identifying in real-time a response to a grid service request that most beneficially balances potential revenue versus lifecycle costs incurred by the system.

In some implementations, the system controller uses a scoring model to determine a response score for each of a plurality of candidate responses to the grid service request. As an example, the system controller can iteratively adjust at least one operational parameter of an input candidate response and input the adjusted operational parameters of the input candidate response into the scoring model to obtain a response score. Such iterative adjustments can be made until a desired response score is achieved. As example, the iteratively adjusted operational parameter can include one or both of the total power setpoint and the split value.

In some implementations, the scoring model includes an asset life scoring component that outputs the asset life impact value based at least in part on the split value. The scoring model can also include a revenue generation scoring component that outputs a revenue value based at least in part on the grid service request and the total power setpoint. Thus, the response score can be provided by the scoring model based at least in part on the revenue value and the asset life impact value.

In some implementations, the scoring model includes or otherwise leverages one or more asset life maps for one or more of the energy generation assets and energy storage assets. The asset life map for each asset can output various costs values (e.g., the asset life impact value) as a function of an asset power output setpoint or other input parameters and/or provided data (e.g., market input data, operator input data, system constraint data, state of asset data, and/or environmental data). In some implementations, the asset life maps can take the form of lookup tables that have various cost values logically associated with certain sets of input values. The asset life maps can be predetermined and stored and accessed from a memory or can be generated in real-time based on respective models of the energy generation or storage assets.

In other implementations, the scoring models are dynamic models or are models that are useful for performing dynamic modeling. For example, the models can have a predictive capability such that the models predict or otherwise assist in determining a future operational status of one or more of the energy storage or generation assets in addition to a current operational status of such asset(s). Thus, in conjunction with such scoring models, the system controller can incorporate dynamic decision making techniques to assist in determining a desired response to a grid service request. In these or other implementations, the system controller can implement solvers or solving techniques (e.g., sequential quadratic programming, genetic algorithms, etc.) to assist in determining the desired response to the grid service request.

Further, the system controller can implement the techniques of the present disclosure in an online and/or offline fashion. In particular, the optimization problem can be solved online using the solvers described herein. However, as an example, such optimization problem can also be solved offline for a relevant set of possible combinations of input parameters, and the result can be stored in a lookup table, which would then be included within or otherwise accessible by the control logic of the system.

Thus, the systems and methods according to example aspects of the present disclosure leverage the above insights to determine in real-time a desired power split between energy generation assets and energy storage assets for the purpose of providing beneficial services (e.g., firming, grid ancillary services, energy arbitrage, etc.). Certain systems of the present disclosure can operate with an objective of identifying a candidate response with a largest response score, where the response score is indicative of a revenue value, an asset life impact value, and various operational costs (such as fuel, and recharge price), while guaranteeing satisfaction of various system constraints.

With reference now to the Figures, example embodiments of the present disclosure will now be discussed in detail.

FIG. 1 depicts an example energy generation and storage system 100 according to example embodiments of the present disclosure. The energy generation and storage system 100 includes one or more energy generation assets 102, one or more energy storage assets 104, and a system controller 200 that is communicatively coupled to the generation assets 102 and the storage assets 104. The energy generation and storage system 100 can be a standalone power system or can be implemented as part of a large-scale renewable energy system, such as wind farm or solar farm. The energy generation and storage system 100 is selectively coupled to a grid.

The one or more energy generation assets 102 can include any number of energy generating components. For example, the energy generation assets 102 can include, without limitation, gas engine generators, gas turbines, wind turbines, solar cells, steam turbines, hydroelectric generators, nuclear power assets, or other devices capable of generating energy.

The one or more energy storage assets 104 can include any number of energy storing components. For example, the energy storage assets 104 can include a battery energy storage system (BESS). The BESS can include one or more battery energy storage devices, such battery cells or battery packs. The battery energy storage devices can contain one or more sodium nickel chloride batteries, sodium sulfur batteries, lithium ion batteries, nickel metal hydride batteries, or other similar devices. The present disclosure is discussed with reference to a battery energy storage system for purposes of illustration and discussion, those of ordinary skill in the art, using the disclosures provided herein, should understand that other energy storage devices (e.g., capacitors, fuel cells, etc.) can be used without deviating from the scope of the present disclosure.

The BESS can include a battery management system (BMS). In some implementations, the BMS can be a component of the system controller 200 or can otherwise be communicatively coupled to the system controller 200 (e.g., to provide feedback such as state of asset data to the controller 200).

The BMS can include one or more electronic devices that monitor one or more of the battery energy storage devices, such as by protecting the battery energy storage device from operating outside a safe operating mode, monitoring a state of the battery energy storage device, calculating and reporting operating data for the battery energy storage device, controlling the battery energy storage device environment, and/or any other suitable control actions. For example, in several embodiments, the BMS is configured to monitor and/or control operation of one or more energy storage devices. The BMS can be, for example, a logic controller implemented purely in hardware, a firmware-programmable digital signal processor, or a programmable processor-based software-controlled computer.

The BESS can be coupled to a DC to DC converter. The DC to DC converter can be a buck converter, boost converter, or buck/boost converter. The DC to DC converter can convert a DC voltage at a DC bus to a suitable DC voltage for providing power to or receiving power from the BESS. The DC bus can be a standalone DC bus between the DC to DC converter and an inverter. Alternatively, the DC bus can be a DC bus of a two-stage power converter used to convert energy from a renewable energy source to suitable power for the AC grid.

The DC to DC converter can include one or more electronic switching elements, such as insulated gate bipolar transistors (IGBT). The electronic switching elements can be controlled (e.g., using pulse width modulation) to charge or to discharge the battery energy storage system 110. In addition, the electronic switching elements can be controlled to condition DC power received or provided to the BESS 115.

The energy generation and storage system 100 can further include an inverter. The inverter can be configured to convert DC power on the DC bus to suitable AC power for application to the utility grid (e.g., 50 Hz or 60 Hz AC power). The inverter can include one or more electronic switching elements, such as IGBTs. The electronic switching elements can be controlled (e.g., using pulse width modulation) to convert the DC power on the DC bus to suitable AC power for the grid. The inverter can provide AC power to the grid through a suitable transformer and various other devices, such as switches, relays, contactors, etc. used for protection of the energy generation and storage system 100.

Figure 2:
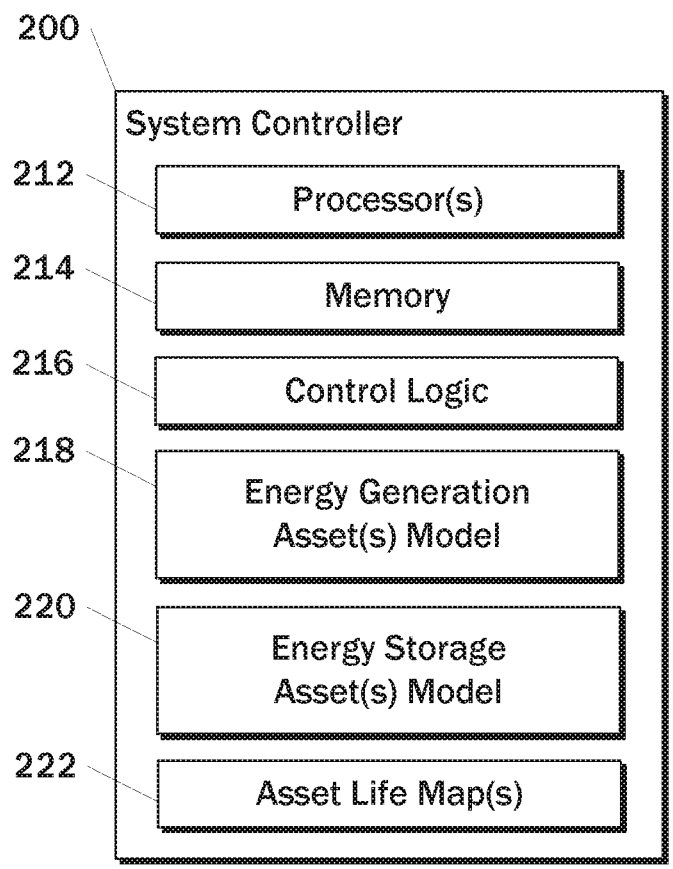
FIG. 2 depicts aspects of an example system controller according to example embodiments of the present disclosure.

The energy generation and storage system 100 can also include a system controller 200 that is configured to monitor and/or control various aspects of the energy generation and storage system 100 as shown in FIGS. 1 and 2. For example, the controller 200 can be configured to control the energy generation and storage system 100 to respond to grid service requests according to example aspects of the present disclosure discussed herein.

Referring particularly to FIG. 2, the controller 200 can have any number of suitable control devices. The controller 200 can be a farm level controller or a controller of one or more individual energy generation and/or energy storage assets.

As illustrated, for example, the controller 200 can include one or more processor(s) 212 and one or more memory device(s) 214 configured to perform a variety of computer-implemented functions and/or instructions (e.g., performing the methods, steps, calculations and the like and storing relevant data as disclosed herein). The instructions when executed by the processor(s) 212 can cause the processor(s) 212 to perform operations according to example aspects of the present disclosure. For instance, the instructions when executed by the processor(s) 212 can cause the processor(s) 212 to implement one or more control modules, such as the control logic as will be discussed in more detail below.

Additionally, the controller 200 can include a communications module to facilitate communications between the controller 200 and the various components of the system 100. Further, the communications module can include a sensor interface (e.g., one or more analog-to-digital converters) to permit signals transmitted from one or more sensors to be converted into signals that can be understood and processed by the processors 212. It should be appreciated that the sensors can be communicatively coupled to the communications module using any suitable means, such as a wired or wireless connection. The signals can be communicated using any suitable communications protocol.

As such, the processor(s) 212 can be configured to receive one or more signals from the sensors. For instance, the processor(s) 212 can receive signals indicative of the state of charge of the energy storage assets 104 from a monitoring device configured to monitor a state of charge of the energy storage assets 104 in the energy storage system 100. The processor(s) 212 can also receive signals indicative of power delivery (e.g., amount of power charging/discharging) from additional sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits.

Additionally, the memory device(s) 212 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 214 can generally be configured to store suitable computer-readable instructions that, when implemented by the processor(s) 212, configure the controller 200 to perform the various functions as described herein.

The system controller 200 can also include control logic 216. The control logic 216 can be computer logic utilized to provide desired functionality. Thus, the control logic 216 can be implemented in hardware, firmware and/or software controlling a general purpose processor. In one embodiment, the control logic 216 includes program code files stored on the storage device, loaded into memory and executed by a processor or can be provided from computer program products, for example, computer executable instructions that are stored in a tangible computer-readable storage medium such as RAM hard disk or optical or magnetic media. The system controller 200 can implement the control logic 216 to perform the methods 300, 400, and 500 of FIGS. 3-5.

The system controller 200 can also include an energy generation asset(s) model 218 and an energy storage asset(s) model 220. The models 218 and 220 model the assets 102 and 104, respectively. Generally, the models 218 and 220 respectively model the assets 102 and 104 by describing expected behavior of the assets under certain described circumstances and in view of various operational inputs and data (e.g., previous and/or current state of asset data, market input data 122, operator input data 124, system constraint data 126, and/or environmental data 128). The models 218 and 220 can model the assets 102 and 104 collectively or can model each asset individually.

In some implementations, the asset(s) models 218 and 220 include or are based on a variety of observed measurements, such as actual measurements of physical quantities associated with various operating states of the assets given certain conditions. Further, the models 218 and 220 can be continuously updated or revised based on data or other measurements collected from the assets 102 and 104 during operation of the system 100. For example, the newly obtained measurements can be used to adjust parameters included in the models 218 and 220 to cause the models 218 and 220 to reflect actual current operational states of the assets.

In some implementations, the models 218 and 200 respectively include or otherwise leverage one or more asset life maps 222 for one or more of the energy generation assets and energy storage assets. The asset life map 222 for each asset can output various costs values (e.g., the asset life impact value) as a function of an asset power output setpoint or other input parameters and/or provided data (e.g., market input data 122, operator input data 124, system constraint data 126, state of asset data, and/or environmental data 128). In some implementations, the asset life maps 222 can take the form of lookup tables that have various cost values logically associated with certain sets of input values. The asset life maps 222 can be predetermined and stored and accessed from memory 214 or can be generated in real-time based on the models 218 and 220 of the energy generation and storage assets.

In some implementations, the asset life maps 222 or other maps accessible to controller 200 can include modifiers (e.g., weighting factors or coefficients) that relate various cost values to various potential revenue values (e.g., allow expression of cost and revenue values in matching units).

In other implementations, the scoring models 218 and 220 are dynamic models or are models that are useful for performing dynamic modeling. For example, the models 218 and 220 can have a predictive capability such that the models predict or otherwise assist in determining a future operational status of one or more of the respective energy storage or generation assets in addition to a current operational status of such asset(s). Thus, in conjunction with such scoring models 218 and 220, the system controller 200 can incorporate dynamic decision making techniques to assist in determining a desired response to a grid service request.

Referring again to FIG. 1, the controller 200 can access, obtain, or receive various types of data, including market input data 122, operator input data 124, system constraint data 126, and environmental data 128. Each of the described types of data 122-128 can come from one or multiple sources. Some data may be input by an operator of the system 100. Some data may be accessed over a network (e.g., Internet) from various sources.

Market input data 122 can include data that describes various market inputs. For example, the market input data 122 can include data that describes real-time market prices (e.g., for energy and/or ancillary services), day ahead market prices (e.g., for energy and/or ancillary services), fuel prices, or other prices for various items that may be bought or sold from a market (e.g., an energy market associated with the grid).

In some implementations, the market input data 122 can include or convey one or more grid service requests. In other implementations, the controller 200 can determine one or more grid service requests based on the market input data 122. The grid service requests can be requests for beneficial services such as peak shaving, frequency response, ramp rate control, purchasing and selling of energy, load following, energy arbitrage, and other grid services. The grid service requests can specify a requested amount of power and/or a requested duration. The grid service requests or other associated agreements can specify a potential revenue associated with satisfaction of a grid service request. The grid service requests or other associated can specify certain performance parameters that are mandatory or requested (e.g., supplied power should be within a certain frequency range). If the supplied grid service does not meet the performance parameters, the potential revenue can be decreased by some factor.

Operator input data 124 can include data that describes various operator inputs. For example, operator input data 124 can include data that describes one or more life-cycle assessments, one or more discount rates, one or more power purchase agreement (e.g., existing or potential agreements), or other inputs that may be provided by an operator of the system 100.

System constraint data 126 can include data that describes various constraints of the system 100. For example, system constraint data 126 can include data that describes one or more constraints on emissions of the system 100, interconnection limits or standards for connecting to the grid, or other system constraints.

Environmental data 128 can include data that describes various environmental conditions. For example, environmental data 128 can include data that describes an ambient temperature at one or more of the energy generation and/or storage assets, an ambient humidity at one or more of the energy generation and/or storage assets, an ambient pressure at one or more of the energy generation and/or storage assets, weather forecasts for locations of one or more of the energy generation and/or storage assets, hazardous conditions potentially damaging to assets or preventative of maintenance thereto, or other environmental conditions.

Further, in some implementations, the energy generation assets 102 and/or energy storage assets 104 can provide feedback signals to the controller 200. For example, the feedback signals can be provided by assets 102 and 104 to the models 218 and 220, respectively. The feedback signals can include state of asset data (e.g., presently observed physical measurements) that describes the status of various operational parameters or other current conditions at the assets.

In some implementations, the feedback signals can be used to update the models 218 and 220 by, for example, revising or adjusting parameters included in the models 218 and 220 to more precisely reflect the actual current states of the assets. Thus, in some implementations, the controller 200 can receive feedback signals that contain data indicative of a current operational status of the assets 102 and 104. The controller 200 can analyze such feedback signals to determine a current state of each of the assets 102 and 104.

As one example, the energy generation assets 102 can provide state of asset data to the model 218 that includes data that describes a current power output setpoint of each of the one or more energy generation assets 102; a current effective power output by each of the one or more energy generation assets 102; a current state of health of each of the one or more energy generation assets 102; for assets that include rotating parts, a current RPM of such assets; internal or external temperatures at each of the one or more energy generation assets 102; emissions status for each asset 102; and a current and/or expected efficiency for each asset 102; or other state of asset data.

As another example, the energy storage assets 104 can provide state of asset data to the model 220 that includes data that describes a current power output setpoint of each of the one or more energy storage assets 104; a current effective power output by each of the one or more energy storage assets 104; a current state of health of each of the one or more energy storage assets 104; a current state of charge of each of the one or more energy storage assets 104; internal temperatures, external temperatures, and/or expected change in temperatures ("delta T's") at each of the one or more energy generation assets 102; a current and/or expected efficiency for each asset 102; inverter information; or other state of asset data.

Having accessed or received the above described data, the system controller 200 can implement the control logic 216 to determine a desired response to the system to a grid service request. As an example, by implementing the methods discussed with reference to FIGS. 3-5 below, the system controller 200 can determine a total power setpoint of the system 100 and a split value for that describes a power split between the generation assets 102 and the storage assets 104. The total power setpoint of the system 100 can be the sum of a plurality of asset power output setpoints respectively associated with the assets 102 and 104. The asset power output setpoint for a particular energy storage asset can be positive or negative. A positive asset power output setpoint corresponds to the particular energy storage asset providing power to the load (e.g., grid) or other system components while a negative asset power output setpoint corresponds to the particularly energy storage asset receiving power (e.g., charging) from the load (e.g., grid) or other system components.

Thus, the state of asset data can impact the ultimate total power setpoint and/or split value of the response. As one example, if an energy storage asset has a limited amount of life left and an energy generation asset has higher than expected efficiency, the control logic 216 may decide to increase the relative asset power output setpoint of the energy generation asset so that the more efficient asset provides a greater portion of the power, while reducing the relative portion provided by the storage asset with limited remaining lifespan.

Likewise, market input data 122 can impact the desired response. As one example, if the price of frequency regulation increased disproportionally from the selling price of energy, the combined system may be enticed to provide frequency regulation. However, the energy storage assets may have relatively higher degradations on their cycle life with frequency regulation while the energy generation assets would be potentially running at lower power levels for short periods of time that would increase emissions and reduce efficiency. The control logic 216 might act on such information and corresponding insights to select the grid service(s) to participate in, determine the power split between grid services, reduce the power output or relative performance in the grid service, and select the power splits between the energy generation and storage.

Environmental data 128 can also be used as a dynamic input to the decision making process. As one example, if there is a relatively high ambient temperature, the energy storage assets may have relatively higher degradations on their cycle life while a thermal energy generation asset may have a reduced potential for power output. The control logic 216 might act on such information and corresponding insights to reduce the power output and select the power splits.

Furthermore, as noted above, the systems and methods according to example aspects of the present disclosure (e.g., control logic 216) can incorporate dynamic decision making techniques to assist in determining a desired response to a grid service request. For example, dynamic decision making techniques can include model based control (MBC); model predictive control (MPC); proportional-integral-derivative control (PID); stochastic dynamic programming; non-linear programming; deterministic optimization; and heuristics strategies in addition to dynamic inputs. In these or other implementations, the system controller can implement solvers or solving techniques (e.g., sequential quadratic programming, genetic algorithms, etc.) to assist in determining the desired response to the grid service request.

Figure 3:
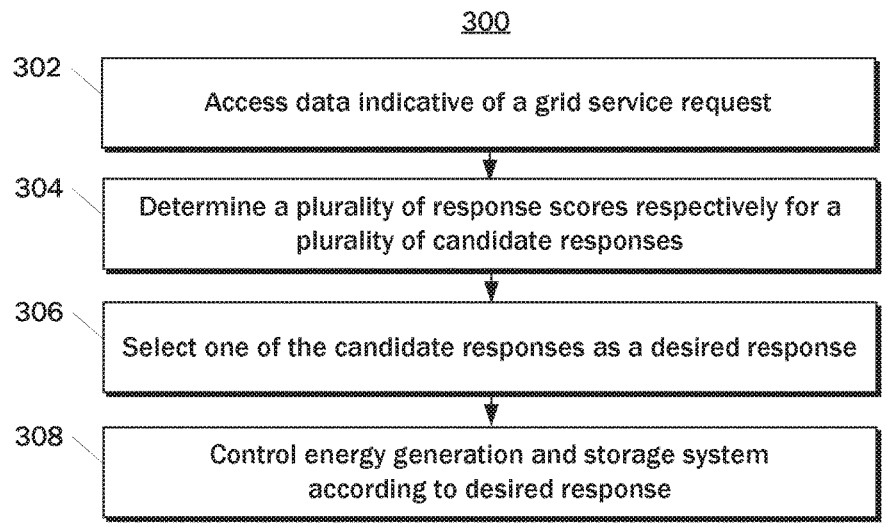
FIG. 3 depicts a flow diagram of an example method for controlling an energy generation and storage system according to example embodiments of the present disclosure.

FIG. 3 depicts a flow diagram of an example method 300 for controlling an energy generation and storage system according to example embodiments of the present disclosure. The method 300 can be implemented by any suitable control device, such as one or more of the control devices discussed with reference to FIGS. 1 and 2.

In addition, FIG. 3 depicts steps performed in a particular order for purposes of illustration and discussion. Those of ordinary skill in the art, using the disclosures provided herein, will understand that the steps of any of the methods disclosed herein can be modified, adapted, rearranged, omitted, and/or expanded in various ways without deviating from the scope of the present disclosure.

At 302, the system controller 200 accesses data indicative of a grid service request. For example, the controller 200 can determine one or more grid service requests based on the market input data 122. The grid service requests can be requests for beneficial services such as peak shaving, frequency response, ramp rate control, purchasing and selling of energy, load following, energy arbitrage, and other grid services. The grid service requests can specify a requested amount of power and/or a requested duration. The grid service requests or other associated agreements can specify a potential revenue associated with satisfaction of a grid service request. The grid service requests or other associated can specify certain performance parameters that are mandatory or requested (e.g., supplied power should be within a certain frequency range). If the supplied grid service does not meet the performance parameters, the potential revenue can be decreased by some factor.

At 304, the system controller 200 determines a plurality of response scores respectively for a plurality of candidate responses. Each candidate response includes one or more operational parameters of the energy generation and storage system. The one or more operational parameters include at least a split value that describes a power split between one or more energy generation assets and one or more energy storage assets of the energy generation and storage system. The one or more operational parameters can further include the total power setpoint of the system. The total power setpoint can be equal to or less than the requested amount of power specified by the grid service request.

In some implementations, the response score determined for each candidate response is based at least in part on an asset life impact value that describes an impact that such candidate response would have on an asset life of at least one of the one or more power generation assets and the one or more energy storage assets of the energy generation and storage system.

As one example, the asset life impact value for a given energy storage asset can be determined based on an expected temperature rise across one or more energy storage cells, a state of charge of the asset, an ambient temperature at the asset, an accumulated degradation of the asset (or other indicators of past performance), or other state of asset data. As another example, the asset life impact value for a given energy generation or storage asset can be based on an estimate of a reduced lifespan of the asset to implement the candidate response and/or a major repair acceleration value that describes an amount by which a major repair may be accelerated if the asset implements the candidate response.

In some implementations, the response score determined for each candidate response is based at least in part on a potential revenue value that describes an amount of revenue generated by such candidate response and a total cost value that describes a total cost incurred by such candidate response. The potential revenue value for each candidate response can take into account the total power setpoint of such candidate response relative to the request amount of power and in view of any performance parameters (and associated revenue modifiers) 'described by the grid service. The total cost value for each candidate response can include or be based on the asset life impact value determined for such candidate response.

In some implementations, a scoring model is used to determine the response score for each candidate response. The scoring model can include an asset life scoring component that outputs the asset life impact value based at least in part on the split value. The scoring model can also include a revenue generation scoring component that outputs a revenue value based at least in part on the grid service request and the total power setpoint. Thus, the response score can be provided by the scoring model based at least in part on the revenue value and the asset life impact value.

As another example, method 400 of FIG. 4, discussed in additional detail below, provides one example method for determining the plurality of response scores.

At 306, the system controller 200 selects one of the candidate responses as a desired response. For example, the candidate response with the largest response score can be selected. As another example, the candidate response with a largest difference between its associated potential revenue value and total cost value can be selected.

At 308, the system controller 200 controls the energy generation and storage system 100 according to the desired response. For example, the controller 200 can control the respective assets 102 and 104 to provide the total power setpoint and split value specified by the desired response.

In some implementations, method 300 can be iteratively performed over a plurality of event time frames. For example, an event time frame may be on the order of seconds, minutes, or tens of minutes. As one example, an event time frame can correspond to 4 seconds.

Figure 4:
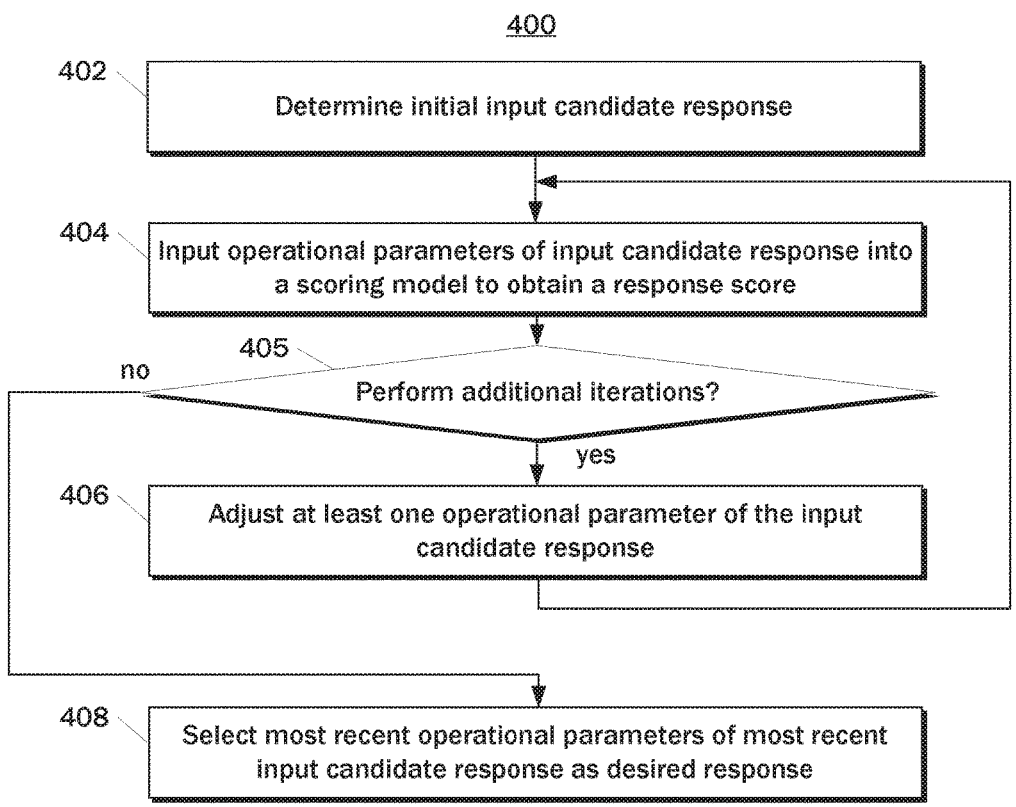
FIG. 4 depicts a flow diagram of an example method for determining response scores according to example embodiments of the present disclosure.

FIG. 4 depicts a flow diagram of an example method 400 for determining response scores according to example embodiments of the present disclosure. The method 400 can be implemented by any suitable control device, such as one or more of the control devices discussed with reference to FIGS. 1 and 2. Method 400 of FIG. 4 is provided as an example only. Many additional methods are contemplated by and included within the present disclosure in addition to method 400.

In addition, FIG. 4 depicts steps performed in a particular order for purposes of illustration and discussion. Those of ordinary skill in the art, using the disclosures provided herein, will understand that the steps of any of the methods disclosed herein can be modified, adapted, rearranged, omitted, and/or expanded in various ways without deviating from the scope of the present disclosure.

At 402, the system controller 200 determines an initial input candidate response. For example, the initial input candidate response can be a current parameters set that describes the current operational parameters of the system 100. As another example, the initial input candidate response can be a default response (e.g., where the total power setpoint equals the requested amount of power and the split value equals 1 for generation assets 102 and 0 for storage assets 104). As another example, the initial input candidate response can be operational parameters described by a most recently performed response (e.g., the parameters of the most recently performed response to a grid service request).

At 404, the system controller 200 inputs the operational parameters of the input candidate response into a scoring model to obtain a response score.

At 405, the system controller 200 determines whether additional iterations should be performed. For example, the method 400 can be configured to cease iterations when a certain number of iterations have been performed (e.g., 1000). If such number has been reached, then at 405, the system controller 200 can determine that additional iterations should not be performed.

As another example, at 405, the system controller can determine an amount by which the most recent iteration (or several of the most recent iterations) improved the response score. If the improvement provided by the most recent iteration (or several most recent iterations) is less than a threshold number, then the system controller 200 can determine that additional iterations should not be performed.

Many additional techniques for determining when the cease iterations are possible. For example, if the response score exceeds a threshold value, then system controller 200 can determine that additional iterations should not be performed.

If the system controller 200 determines at 405 that additional iterations should be performed, then method 400 proceeds to 406.

At 406, the system controller 200 adjusts at least one operational parameters of the input candidate response. As an example, the adjusted operational parameters can include one or both of the total power setpoint and the split value. Different parameters can be adjusted at different iterations.

More particularly, the adjusted parameters can include asset-specific parameters. For example, while the total power setpoint and the split value may remain constant, particular asset power output setpoints can be adjusted.

After 406, method 400 returns to 404 and again inputs the operational parameters of the input candidate response into the scoring model to obtain a response score. In such fashion, one or more operational parameters of the input candidate response are iteratively adjusted to iteratively improve the response score until it is determined that additional iterations should not be performed.

However, referring again to 405, if the system controller 200 determines that additional iterations should not be performed, then method 400 proceeds to 408. At 408, the system controller 200 selects the most recent operational parameters of the most recent input candidate response as a desired response.

Figure 5:
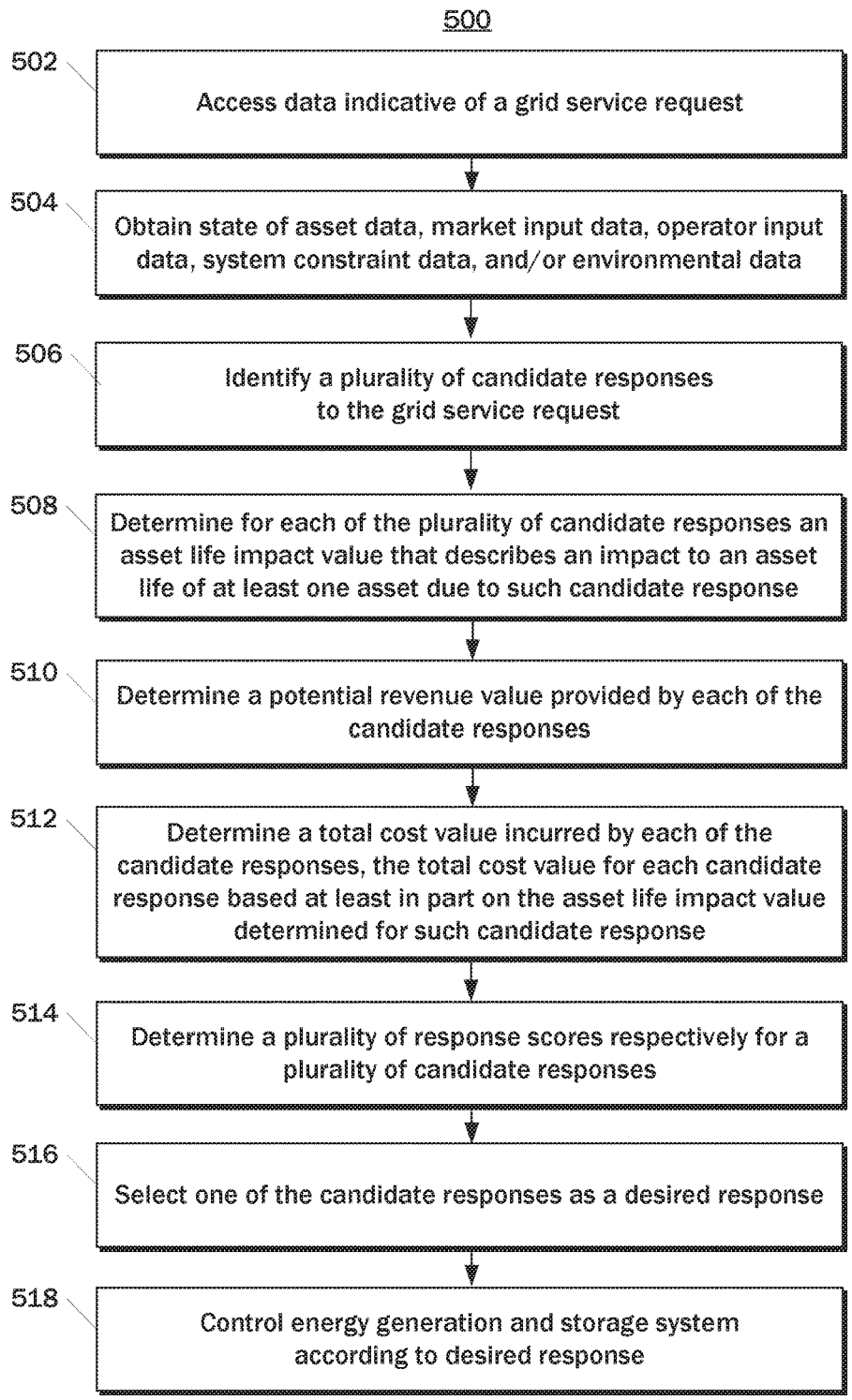
FIG. 5 depicts a flow diagram of an example method for controlling an energy generation and storage system according to example embodiments of the present disclosure.

FIG. 5 depicts a flow diagram of an example method 500 for controlling an energy generation and storage system according to example embodiments of the present disclosure. The method 500 can be implemented by any suitable control device, such as one or more of the control devices discussed with reference to FIGS. 1 and 2.

In addition, FIG. 5 depicts steps performed in a particular order for purposes of illustration and discussion. Those of ordinary skill in the art, using the disclosures provided herein, will understand that the steps of any of the methods disclosed herein can be modified, adapted, rearranged, omitted, and/or expanded in various ways without deviating from the scope of the present disclosure.

At 502, the system controller 200 accesses data indicative of a grid service request. At 504, the system controller obtains state of asset data, market input data, operator input data, system constraint data, and/or environmental data.

At 506, the system controller 200 identifies a plurality of candidate responses to the grid service request. At 508, the system controller 200 determines, for each of the plurality of candidate responses, an asset life impact value that describes an impact to an asset life of at least one asset due to such candidate response.

At 510, the system controller 200 determines a potential revenue value provided by each of the candidate responses. At 512, the system controller 200 determines a total cost value incurred by each of the candidate responses. The total cost value for each candidate response is based at least in part on the asset life impact value determined for such candidate response.

At 514, the system controller 200 determines a plurality of response scores respectively for the plurality of candidate responses. At 516, the system controller 200 selects one of the candidate responses as a desired response based at least in part on the response scores. At 518, the system controller 200 controls the energy generation and storage system 100 according to the desired response.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an energy generation and storage system, the method comprising:
   accessing, by one or more control devices, data indicative of a grid service request;
   using, by the one or more control devices, dynamic modeling for predicting a future operational status of one or more energy generation assets or one or more power generation assets of the energy generation and storage system;
   determining, based on the dynamic modeling, by the one or more control devices, a plurality of response scores respectively for a plurality of candidate responses to the grid service request, each candidate response including one or more operational parameters of the energy generation and storage system, the one or more operational parameters including at least a split value that describes a power split between the one or more energy generation assets and the one or more energy storage assets, and wherein the response score determined for each candidate response is based at least in part on an asset life impact value that describes an impact that such candidate response would have on an asset life of at least one of the one or more power generation assets and the one or more energy storage assets;
   selecting, by the one or more control devices, one of the candidate responses as a desired response to the grid service request based at least in part on the plurality of response scores; and
   controlling, by the one or more control devices, the energy generation and storage system according to at least the split value of the desired response, wherein determining, by the one or more control devices, the plurality of response scores respectively for a plurality of candidate responses comprises, for each of a plurality of scoring iterations until a desired response score is achieved;
   adjusting, by the one or more control devices, at least one of the one or more operational parameters of an input candidate response; and
   inputting, by the one or more control devices, the adjusted operational parameters of the input candidate response into a scoring model to obtain one of the plurality of response scores;
   wherein the iterative adjustments to the one or more operational parameters of the input candidate response respectively define the plurality of candidate responses.

2. The method of claim 1, wherein adjusting, by the one or more control devices, the at least one of the one or more operational parameters of the input candidate response comprises adjusting, by the one or more control devices, the split value of the input candidate response.

3. The method of claim 1, wherein adjusting, by the one or more control devices, the at least one of the one or more operational parameters of the input candidate response comprises adjusting, by the one or more control devices, a total power setpoint of the energy generation and storage system, the total power setpoint less than or equal to a requested amount of power specified by the grid service request.

4. The method of claim 1, wherein the scoring model includes an asset life scoring component that outputs the asset life impact value based at least in part on the split value.

5. The method of claim 4, wherein the asset life scoring component outputs the asset life impact value based at least in part on one or more of a projected temperature rise across one or more energy storage cells, a state of charge of the one or more energy storage cells, and an ambient temperature at the one or more energy storage cells.

6. The method of claim 4, wherein the asset life scoring component comprises one or more asset life maps for one or more of the energy generation assets and energy storage assets, wherein the asset life map for each asset outputs the asset life impact value as a function of an asset power output setpoint.

7. The method of claim 6, wherein the one or more asset life maps respectively comprise one or more lookup tables.

8. The method of claim 4, wherein:
   the scoring model further includes a revenue generation scoring component that outputs a revenue value based at least in part on the grid service request; and
   the response score is based at least in part on the revenue value and the asset life impact value.

9. The method of claim 8, wherein:
   the grid service request specifies a requested amount of power;
   the one or more operational parameters of each candidate response further include a total power setpoint of the energy generation and storage system, the total power setpoint less than or equal to the requested amount of power;
   the revenue generation scoring component outputs the revenue value based at least in part on the total power setpoint and the requested amount of power; and
   the asset life scoring component outputs the asset life impact value based at least in part on a total power setpoint and the split value.

10. The method of claim 1, wherein selecting, by the one or more control devices, one of the candidate responses as the desired response based at least in part on the plurality of response scores comprises selecting, by the one or more control devices, the candidate response with the largest response score as the desired response.

11. The method of claim 1, further comprising:
    iteratively performing, by the one or more control devices, the method of claim 1 over a plurality of event time frames.

12. The method of claim 1, wherein determining, by the one or more control devices, a plurality of response scores respectively for a plurality of candidate responses comprises iteratively adjusting, by the one or more control devices, the one or more operational parameters until a candidate response with a desired response score is achieved.

13. A system controller for controlling one or more energy generation assets and one or more energy storage assets, the system controller comprising at least one processor and a non-transitory computer-readable medium storing instructions that, when executed by the at least one processor, cause the system controller to:
receive data indicative of a grid service request;
use dynamic modeling for predicting a future operational status of one or more energy generation assets or one or more power generation assets of an energy generation and storage system;
identify, based on the dynamic modeling, a plurality of candidate responses to the grid service request, wherein each candidate response includes one or more operational parameters, and wherein the one or more operational parameters include at least a split value that describes a power split between the one or more energy generation assets and the one or more energy storage assets;
obtain state of asset data for at least one of the energy generation assets and energy storage assets, wherein the state of asset data for the at least one asset describes at least one of a state of health, a state of charge, a state of emissions, and an efficiency for such asset;
determine, for each of the plurality of candidate responses, an asset life impact value that describes an impact to an asset life of one or more of the energy generation assets and the energy storage assets due to such candidate response, wherein the asset life impact value determined for at least one of the energy generation assets or the energy storage assets is based at least in part on the state of asset data obtained for such energy generation asset or energy storage asset;
determine, for each of the plurality of candidate responses, a potential revenue value provided by such candidate response;
determining, for each of the plurality of candidate response, a total cost value incurred by the system due to such candidate response, wherein the total cost value for each candidate response is based at least in part on the asset life impact value determined for such candidate response;
determine, for each of the plurality of candidate responses, a response score based at least in part on a difference between the potential revenue value and the total cost value;
select the candidate responses with the largest response score as a desired response; and
control the one or more energy generation assets and the one or more energy storage assets in accordance with the desired response.

14. The system controller of claim 13, wherein the instructions further cause the system controller to:
obtain real-time market input data that describes a current state of one or more market inputs, wherein the system controller determines at least one of the potential revenue value and the total cost value for each candidate response based at least in part on the market input data.

15. The system controller of claim 13, wherein the instructions further cause the system controller to:
obtain real-time environmental data that describes a current state of one or more environmental conditions, wherein the system controller determines at least one of the potential revenue value and the total cost value for each candidate response based at least in part on the current state of the one or more environmental conditions.

16. The system controller of claim 13, wherein the instructions further cause the system controller to:
obtain system constraint data that describes a current state of one or more system constraints, wherein the system controller determines, for each candidate response, at least one of the potential revenue value and the total cost value based at least in part on the current state of the one or more system constraints.

17. The system controller of claim 13, wherein the instructions that cause the system controller to determine the asset life impact value and the total cost value cause the system controller to:
utilize an asset life map to obtain the total cost value for each candidate response, wherein the asset life map provides the total cost value as a function of one or more input parameters, the one or more input parameters including at least the state of asset data.

18. An energy generation and storage system, comprising:
one or more energy generation assets;
one or more energy storage assets; and
a system controller according to claim 13 communicatively coupled to the one or more energy generation assets and to the one or more energy storage assets.

* * * * *